United States Patent [19]
Kawamura et al.

[11] Patent Number: 5,568,249
[45] Date of Patent: Oct. 22, 1996

[54] PHASE DIFFERENCE DETECTION TYPE RANGEFINDER AND METHOD OF MEASURING SUBJECT DISTANCE

[75] Inventors: Kazuo Kawamura; Jun Hasegawa; Takashi Miida, all of Miyagi, Japan

[73] Assignee: Fuji Photo Film Co., Ltd., Kanagawa, Japan

[21] Appl. No.: 229,818

[22] Filed: Apr. 19, 1994

[30] Foreign Application Priority Data

Apr. 19, 1993 [JP] Japan .................................. 5-091593

[51] Int. Cl.$^6$ .................................................. G01C 3/08
[52] U.S. Cl. ........................ 356/3.14; 250/201.8; 396/119; 396/128
[58] Field of Search .................................. 356/3.14, 4.03

[56] References Cited

U.S. PATENT DOCUMENTS

| | | | |
|---|---|---|---|
| 4,660,955 | 4/1987 | Ishida et al. | 354/4.08 |
| 4,668,084 | 5/1987 | Suzuki et al. | 356/3.14 |
| 5,131,740 | 7/1992 | Maekawa | 356/3.14 |
| 5,189,461 | 2/1993 | Ishiguro | 354/402 |
| 5,255,064 | 10/1993 | Maekawa | 356/3.14 |
| 5,257,061 | 10/1993 | Ishiguro | 354/402 |
| 5,357,310 | 10/1994 | Kawamura et al. | 354/408 |

*Primary Examiner*—Thomas H. Tarcza
*Assistant Examiner*—Pinchus M. Laufer
*Attorney, Agent, or Firm*—Sughrue, Mion, Zinn, Macpeak & Seas

[57] ABSTRACT

A phase difference detection type rangefinder is provided which calculates a distance value of each subject of two or more subjects at different distances. The rangefinder has a correlation calculation unit for calculating a correlation factor between images of a same subject focussed on a base photosensor and a reference photosensor, a second order differentiation unit for calculating second order differential values of correlation factors calculated by the correlation calculation unit, a second order differential value comparison unit for selecting a maximum second order differential value from the second order differential values calculated by the second order differentiation unit, a three-point interpolation unit for calculating an interpolation value through three-point interpolation using the maximum second order differential value and two second order differential values having the phases before and after the phase of the maximum second order differential value, and a distance value calculation unit for calculating a distance value from the phase of the maximum second order differential value and the interpolation value.

12 Claims, 17 Drawing Sheets

FIG.10

CORRELATION FACTORS FOR SINGLE SUBJECT (Bf=98.4460)

| SHIFT No. | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| CORRELATION FACTORS | 185 | 195 | 210 | 221 | 224 | 214 | 193 | 162 | 133 | 165 | 195 | 214 | 230 | 224 | 214 | 198 | 189 |
| FIRST ORDER DIFFERENTIAL VALUES | 10 | 5 | 11 | 3 | −10 | −21 | −31 | −29 | 32 | 30 | 19 | 16 | −6 | −10 | −16 | −9 | |

FIG.11

CORRELATION FACTORS FOR TWO SUBJECTS (Bf=98.4460)

| SHIFT No. | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| CORRELATION FACTORS | 202 | 205 | 221 | 235 | 247 | 252 | 242 | 215 | 181 | 184 | 186 | 195 | 223 | 236 | 245 | 237 | 230 |
| FIRST ORDER DIFFERENTIAL VALUES | 3 | 16 | 14 | 12 | 5 | −10 | −27 | −34 | 3 | 2 | 9 | 28 | 13 | 9 | −8 | −7 | |
| SIGN-INVERTED SECOND ORDER DIFFERENTIAL VALUES | −13 | 2 | 2 | 7 | 15 | 17 | 7 | −37 | 1 | −7 | −19 | 15 | 4 | 17 | −1 | | |

FIG.14A (PRIOR WORK)
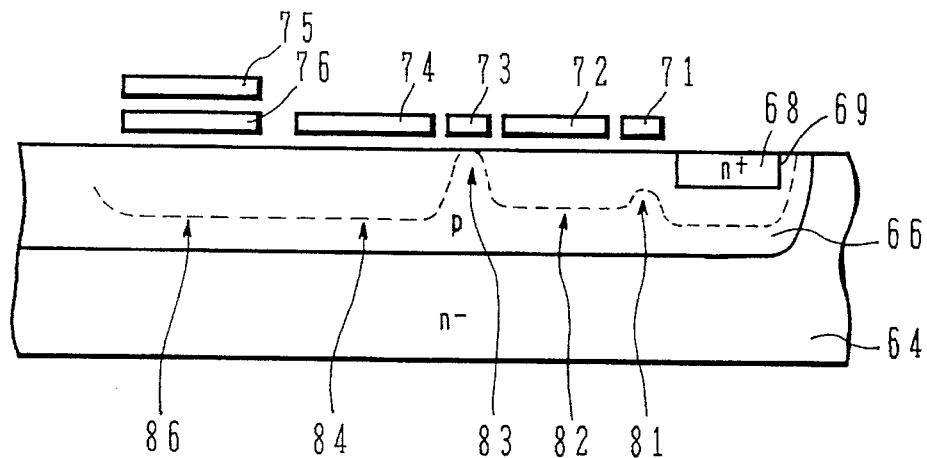
FIG.14B (PRIOR WORK)
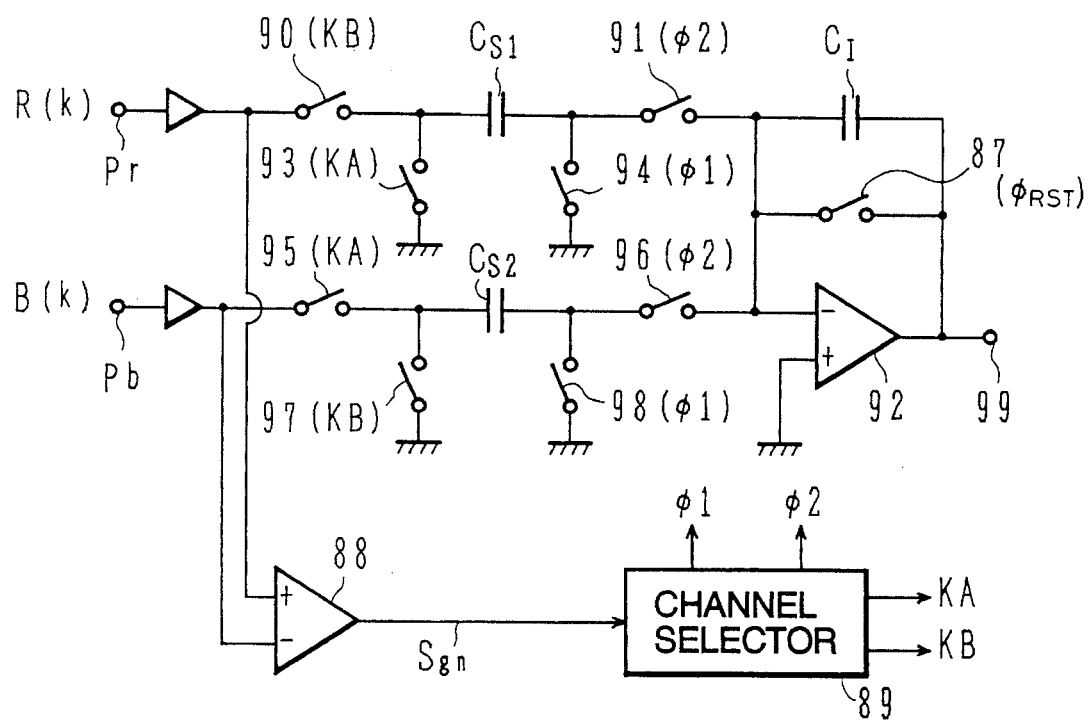

PHASE DIFFERENCE DETECTION TYPE RANGEFINDER AND METHOD OF MEASURING SUBJECT DISTANCE

BACKGROUND OF THE INVENTION a) Field of the Invention

The present invention relates to a method of measuring a subject distance, and more particularly to a phase difference detection type rangefinder for measuring a subject distance to detect a camera focus point and the like.

b) Description of the Related Art

FIGS. 13A and 13B show an example of a rangefinder of a TTL (through-the-lens) and phase difference detection type according to a conventional technique. FIG. 13A shows an example of the structure of the rangefinder, and FIG. 13B shows an example of a processor circuit of the rangefinder. The rangefinder used as a camera focus point detector will be described by way of example.

Light from a subject to be photographed is converged by a taking lens 51, passes through a film equivalent plane 52, and transmits to a condenser lens 53 and a separator lens 54. The separator lens 54 separates the incident light into two light beams which are focussed onto a base line sensor 55 and a reference line sensor 56. The separator lens 54 separates an image of the subject on an optical axis 58 of the taking lens 51 into two images which are focussed onto the line sensors 55 and 56.

The line sensor 55 has p light receiving elements and is called a base line sensor because this sensor is used as a basis for rangefinding. The line sensor 56 called a reference line sensor has q light receiving elements more than p elements. Signals are read from p light receiving elements among the q elements while changing the phase of reading the signals, and compared with corresponding signals read from the base line sensor 55.

Signals detected by the base and reference line sensors 55 and 56 are supplied to a processor circuit 57. The processor circuit 57 calculates correlation factors to be described later, to thereby obtain a correlation extreme and detect an in-focus point while changing the phase of reading signals from the reference line sensor 56.

FIG. 13B shows an example of the structure of the processor circuit 57. Signals from the base and reference line sensors 55 and 56 are supplied to an A/D converter 59 which converts the analog signals into digital signals. The digital signals are temporarily stored in a RAM 61 under the operation of a CPU 60. The digital signals are then read from RAM 61, and CPU 60 performs correlation factor calculations to detect an extreme of correlation factors and generate an output signal representing a distance to a subject.

In the focus point detector shown in FIGS. 13A and 13B, charges accumulated in the photosensors are directly charge-voltage converted. The detected signals are converted into digital signals and stored in RAM 61. The digital signals are thereafter read to perform correlation factor calculations.

The present applicant has proposed a focus point detector in which charges accumulated upon application of light are non-destructively read and they are used in the form of analog signals for correlation factor calculations. FIG. 14A shows an example of the structure of a photosensor of such a focus point detector. The photosensor is constructed by forming a p-type well 66 on the surface of an n⁻-type silicon substrate 64 and by forming an n⁺-type region 68 partially in the p-type well 66 to form a p-n junction 69. When light is incident to the neighborhood of the p-n junction 69, electron/hole pairs are generated and they are separated into electrons and holes and stored in accordance with the potential gradient around the p-n junction.

The p-type well 66 extends further to the left region of the p-n junction 69. On this left region, insulated polysilicon gate electrodes 71 to 74 and an insulated floating gate electrode 76 are formed. Next to the photodiode, a barrier region 81 with the gate electrode 71 is formed. Next to the barrier region 81, a storage region 82 with the gate electrode 72 is formed. Charges corresponding to incident light to the photosensor are transferred near from the p-n junction 69 to the storage region 82, via the barrier region 81, and accumulated in the storage region 82. The storage region 82 is contiguous with a shift register region 84 having the gate electrode 74 via a barrier region 83 under the transfer gate electrode 73. The shift register region 84 is contiguous with a read region 86 under the floating gate electrode 76 having a bias applying aluminum electrode 75 formed above the gate electrode 76.

Electron/hole pairs are generated in response to incident light to the photodiode, and carriers pass over the barrier region 81 and are accumulated in the storage region 82 under the gate electrode 72, and further pass over the potential barrier region 83 under the transfer gate electrode 73 and are transferred to the shift register region 84 under the gate electrode 74. Charges accumulated in the shift register region 84 are transferred to the read region 86 under the floating gate electrode 76 in accordance with a voltage applied to the gate electrode 75. Charges corresponding to the transferred charges are induced in the floating gate electrode 76, and an incident light amount is non-destructively read in accordance with the amount of the induced charges. After reading the incident light amount, carriers are again transferred and shifted in the shift register region 84. In this manner, charges in the shift register region 84 are sequentially and non-destructively read.

If the photosensor shown in FIG. 14A is used, calculations of the following equation (1) can be performed by using a switched capacitor integrator and by using detected signals in the form of analog signals.

$$H(m) = \Sigma(k=1-p) \; |B(k)-R(k+m)| \ldots \quad (1)$$

FIG. 14B shows an example of a switched capacitor integrator.

A charge signal B(k) from a base photosensor and a charge signal R(k) from a reference photosensor are applied to input terminals Pb and Pr of the switched capacitor integrator, respectively, and applied via amplifiers to inverting and non-inverting terminals of a differential amplifier 88. The differential amplifier 88 generates a sign signal Sgn in accordance with whether the input signal B(k) is larger than the input signal R(k) or not, and supplies it to a channel select circuit 89. The channel select circuit 89 generates a pair of complementary signals Φ1 and Φ2 and another pair of complementary signals KA and KB, the phases of these signals being inverted in response to the sign signal Sgn.

The input terminal Pr is connected via the amplifier and a switch 90 controlled by the select signal KB to a capacitor CS1 both terminals of which are grounded via switches 93 and 94 controlled by the select signal KA and Φ1. The terminal of the capacitor CS1 on the switch 94 side is connected via a switch 91 controlled by the select signal Φ2 to the inverting input terminal of an operational amplifier 92.

Similarly, the input terminal Pb is connected via the amplifier and a switch 95 controlled by the select signal KA to a capacitor CS2 both terminals of which are grounded via switches 97 and 98, controlled by the select signal KB and Φ1. The terminal of the capacitor CS2 on the switch 98 side is connected via a switch 92 controlled by the select signal to the inverting input terminal of the operational amplifier 92.

The non-inverting terminal of the operational amplifier 92 is grounded. A signal at the output terminal 99 of the operational amplifier 92 is fed back to the inverting input terminal via a parallel circuit of a capacitor C1 and a switch 87 controlled by a select signal $\Phi_{RST}$. Neither the select signals KA and KB nor the select signals Φ1 and Φ2 take a high level at the same time.

When the select signals KB and Φ1 take the high level, the switches 90, 94, 97, and 98 are closed so that the signal R(k) is charged in the capacitor CS1. Both the terminals of the capacitor CS2 are grounded and the charge in the capacitor CS2 is discharged.

Next, when the select signals KA and Φ2 take the high level, the switches 91, 93, 95, and 96 are closed so that the left terminal of the capacitor CS1 is grounded and the right terminal thereof is connected to the inverting terminal of the operational amplifier 92. As a result, the potential of the signal R(k) is inverted in effect. The capacitor CS2 is connected via the switches 95 and 96 across the input terminal Pb and the inverting input terminal of the operational amplifier 92 so that the signal B(k) is charged in the capacitor CS2. Therefore, a difference between the signals R(k) and B(k) is applied to the inverting input terminal of the operational amplifier 92.

When the relationship of amplitude of the signals R(k) and B(k) is reversed, the channel select circuit 89 inverts the phase relationship between the select signals KA and KB and between the select signals Φ1 and Φ2 in accordance with the sign signal Sgn. In this case, the signal B(k) is charged in the capacitor CS2 and the inverted signal is applied to the inverting input terminal of the operational amplifier 92. The signal R(k) is applied via the capacitor CS1 to the inverting input terminal of the operational amplifier 92.

The inverting input terminal of the operational amplifier 92 is therefore always supplied with a signal corresponding to an absolute value of a difference between the signals B(k) and R(k). Absolute values of differences between base signals and corresponding reference signals are detected in this manner and added together to calculate a correlation factor H. The phase difference and focus point can be detected by referring to the correlation factor H.

Detecting a phase difference through correlation factor calculations will be detailed with reference to FIGS. 15A, 15B, and 15C.

As shown in FIG. 15A, an image of a subject is focussed on a base line sensor by a base line sensor lens. The subject image is also focussed on a reference line sensory by a reference line sensor lens. The base line sensor and reference line sensor are spaced apart by a base length in the horizontal direction.

If a subject is at a predetermined position, the same image is focussed on corresponding light receiving elements of the base and reference line sensors 55 and 56. If the subject is at a position different from the predetermined position, images on the base and reference line sensors 55 and 56 are displaced in the horizontal direction. If the subject is at a near position, the distance between images becomes long, whereas if the subject is at a far position, the distance between images becomes short. In order to detect a change in the distance between images, the number of elements of the reference line sensor 56 is set greater than the reference line sensor 55.

A phase difference detecting scheme using correlation factor calculations is used for detecting a change in the distance between images.

In the phase detection through correlation factor calculations, an in-focus state is judged from a relative displacement value (phase difference) which provides a minimum correlation factor between a pair of images projected on the line sensors 55 and 56. The correlation factor is calculated from the equation (1).

$$H(m)=\Sigma(k=1-n)|B(k)-R(k+m)|\ldots (1)$$

where $\Sigma(k=1-n)$ represents a sum of the correlation function for k=1 to n, k represents a reference element of the line sensor 55, and m represents a relative displacement amount and is an integer, for example, from −6 to 6.

The signal B(k) is a time sequential electrical signal outputted from each pixel of the base line sensor 55, and the signal R(k+m) is a time sequential electrical signal outputted from each pixel of the reference line sensor 56. By sequentially changing m from −6 to 6, correlation factors H (−6), H(−5), . . . , H(6) shown in FIG. 15B are calculated from the equation (1). A distance to a subject is given a preset value (position) for a minimum correlation factor of H(0). If a correlation factor becomes minimum at a position different from the preset position, a distance to the subject can be detected from this displacement amount (phase difference from m=0).

Light receiving elements of the base and reference line sensors 55 and 56 are arranged in line by a pitch of, for example, 20 μm. In this case, a correlation factor is calculated at each discrete position corresponding to a 20 μm pitch on an image plane. If a subject is at an intermediate position between two discrete positions, correlation factors on the right side of the extreme become different from correlation factors on the left side as shown by broken lines in FIG. 15B. In such as case, a resolution better than the pitch on an image plane can be obtained by interpolation calculation.

FIG. 15C is a schematic diagram explaining three-point interpolation.

A position with a minimum correlation factor is represented by x2, and sample points on both sides of x2 are represented by x1 and x3. Calculated correlation factors are indicated by solid circles. In the example shown in FIG. 15C, the correlation factor y3 at the position x3 is lower than the correlation factor y1. In this case, a true minimum value exists at the position slightly away from the position x2 and toward the position x3. If the extreme is correct at the position x2, the correlation factor line is folded at the position x2 as indicated by a broken line f1. Assuming that the correlation factor line rises symmetrically from the position x2, the correlation factor y3a at the position x3 becomes equal to the correlation factor y1 at the position x1. If a true minimum value exists at the middle point between the positions x2 and x3, the correlation factor line is folded at the middle point as indicated by a broken line f2, and the correlation factor y2 at the position x2 becomes equal to the correlation factor y3b at the position x3. A difference (y3a −y3b) between two correlation factors at the position x3 is equal to a difference (y1−y2) between two correlation factors at the positions x1 and x2. That is, a half pitch displacement of the minimum produces a change in the correlation factor corresponding to one pitch. The position with a true minimum correlation factor can be obtained by checking at what position between the aforementioned two cases the calculated correlation factor exists. A displacement amount d from the position x2 is given by:

$$d=(y1-y3)/2(y1-y2)$$

A conventional rangefinder detects a single most probable distance even if there is a plurality of subjects in a predetermined rangefinding area. If two or more subjects are present at different distances in the rangefinding area, it is desirable that distances as many as the number of subjects can be detected.

A conventional rangefinder outputs only one distance value from a plurality of measured distances of a plurality of subjects by selecting a median thereof. This value is not highly reliable.

SUMMARY OF THE INVENTION

It is an object of the present invention to provide a phase difference detection type rangefinder capable of detecting a distance to a each subject of a plurality of subjects at different distances in a rangefinding area.

According to one aspect of the present invention, a phase difference detection type rangefinder is provided which has correlation calculation means for calculating a correlation factor between images of a same subject focussed on a base photosensor and a reference photosensor, second order differentiation means for calculating second order differential values of correlation factors calculated by the correlation calculation means, second order differential value comparison means for selecting a maximum second order differential value from the second order differential values calculated by the second order differentiation means, three-point interpolation means for calculating an interpolation value through three-point interpolation using the maximum second order differential value and two second order differential values having the phases before and after the phase of the maximum second order differential value, and distance value calculation means for calculating a distance value from the phase of the maximum second order differential value and the interpolation value.

If two or more subjects are present at different distances in a rangefinding area, correlation factors are differentiated two times to obtain distance values of two or more subjects. If only one subject is present in a rangefinding area, it is possible to detect a distance value by a conventional rangefinding method. It is therefore possible to detect not only a distance value of a single subject present in a rangefinding area, but also distance value of two or more subjects in a rangefinding area.

BRIEF DESCRIPTION OF THE DRAWINGS

FIGS. 2A, 2B, and 2C illustrate the case of a V-shaped correlation curve, in which FIG. 2A shows a correlation curve, FIG. 2B shows a first order differential curve of the curve shown in FIG. 2A, and FIG. 2C shows a second order differential curve of the curve shown in FIG. 2A.

FIGS. 3A, 3B, and 3C illustrate the case of a V-shaped correlation curve, in which FIG. 3A shows a correlation curve, FIG. 3B shows a first order differential curve of the curve shown in FIG. 3A, and FIG. 3C shows a second order differential curve of the curve shown in FIG. 3A.

FIGS. 4A, 4B, and 4C illustrate the case of a U-shaped correlation curve, in which FIG. 4A shows a correlation curve, FIG. 4B shows a first order differential curve of the curve shown in FIG. 4A, and FIG. 4C shows a second order differential curve of the curve shown in FIG. 4A.

FIGS. 5A, 5B, 5C, and 5D are diagrams explaining rangefinding by a two-subject separation method, in which FIG. 5A shows a correlation curve, FIG. 5B shows a first order differential curve of the curve shown in FIG. 5A, FIG. 5C shows a second order differential curve of the curve shown in FIG. 5A, and FIG. 5D shows a sign-inverted second order differential curve of the curve shown in FIG. 5A.

FIG. 10 is a table showing the measurement results of a single object in a rangefinding area by a phase difference detection type rangefinding method according to an embodiment of the present invention.

FIG. 11 is a table showing the measurement results of two objects in a rangefinding area by the phase difference detection type rangefinding method of the embodiment.

FIGS. 13A and 13B are diagrams explaining a conventional technique, wherein FIG. 13A is a schematic diagram showing an example of the structure of a rangefinder, and FIG. 13B is a schematic circuit block diagram of the rangefinder.

FIGS. 14A and 14B are diagrams explaining a technique proposed by the present assignee, wherein FIG. 14A is a schematic cross sectional view of a photosensor, and FIG. 14B is a schematic circuit diagram of a switched capacitor integrator.

FIGS. 15A, 15B, and 15C are diagrams explaining correlation factor calculations through phase difference detection, in which FIG. 15A is a graph showing image signals obtained by base and reference photosensors, FIG. 15B is a graph of a correlation factor curve, and FIG. 15C is a schematic diagram explaining a three-point interpolation method.

DETAILED DESCRIPTION OF THE PREFERRED EMBODIMENTS

Figure 1:
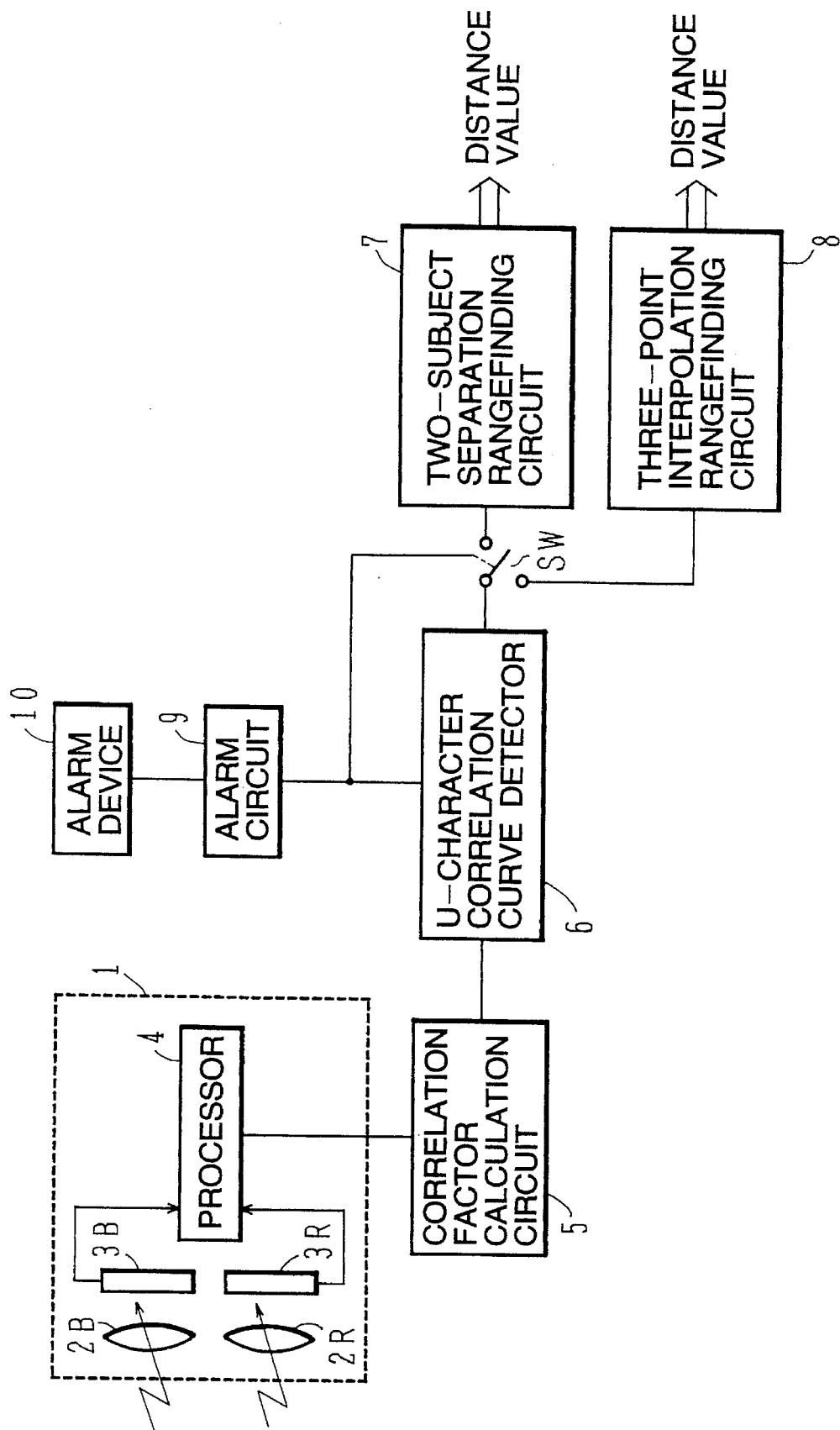
FIG. 1 is a block diagram showing the structure of a phase difference detection type rangefinder according to an embodiment of this invention.

FIG. 1 is a block diagram showing the structure of a phase difference detection type rangefinder according to an embodiment of the present invention. A photoelectric converter circuit 1 includes a lens 2, a photosensor 3, and a processor 4. The photosensor 3 is, for example, a line sensor having photodiodes arranged in line, and the processor 4 reads charges from the linear sensor. These photosensor and processor can be realized by the structure shown in FIG. 14.

Incident light passes through the lens 2 and is focussed onto the photosensor 3. Light passed through a base lens 2B is focussed onto a base photosensor 3B, and light passed through a reference lens 2R is focussed onto a into electric signals which are converted into an electric signal train having a predetermined format by the processor 4.

Signals outputted from the processor 4 are supplied to a correlation calculation circuit 5 to calculate correlation factors between two images focussed onto the two photosensors 3B and 3R. The correlation factors calculated by the correlation calculation circuit 5 are supplied to a U-shaped correlation factor curve detector 6 which checks whether there are two or more subjects at different distances in a rangefinding area.

If a correlation factor curve obtained by the correlation calculation circuit 5 has a U-character shape with a flat bottom, it is determined that two or more subjects are present at different distances in a rangefinding area, and the U-shaped correlation curve detector 6 outputs a two-subject signal. If a correlation factor curve has a V-character shape with a sharp bottom, it is determined that two or more subjects are not present at different distances in a rangefinding area.

The two-subject signal from the U-shaped correlation curve detector 6 is supplied to an alarm circuit 9 which in turn generates an alarm signal indicating that a reliable distance value cannot be obtained by three-point interpolation rangefinding. The alarm signal is supplied to an alarm device 10 which issues an alarm that there are two or more subjects. The alarm device 10 may be a buzzer or a lamp. The alarm circuit 9 also turns a switch SW to the side of a two-subject separation rangefinding circuit 7 to supply the two-subject signal thereto and instruct the circuit to perform two-subject separation rangefinding.

Figure 15A:
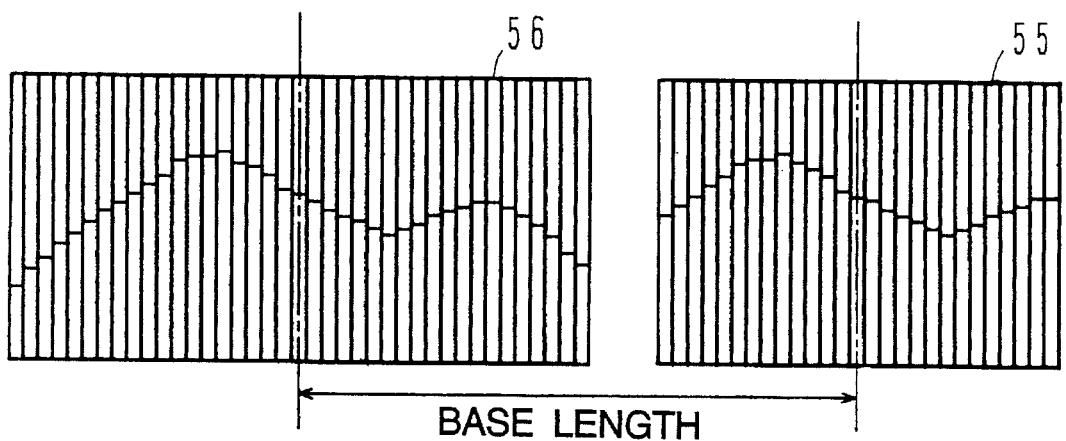
Figure 15B:
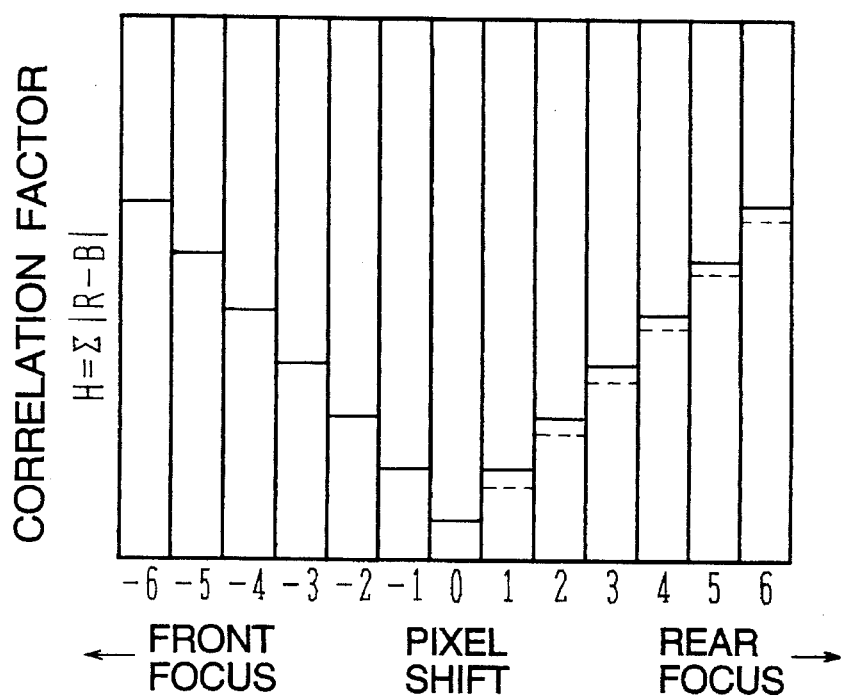
Figure 15C:
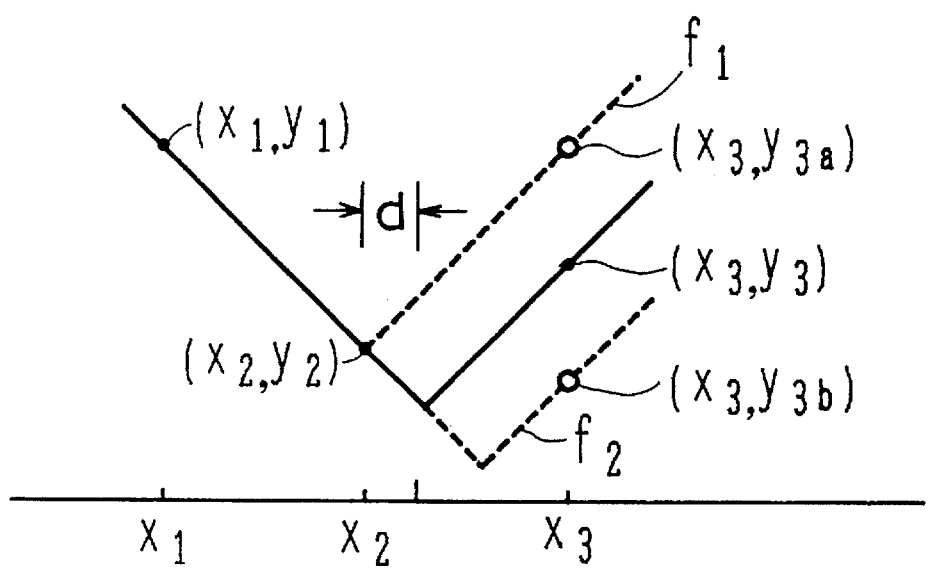

If the U-shaped correlation curve detector 6 judges that the correlation curve has a V-character shape and two or more subjects are not present at different distances in a rangefinding area, the correlation curve is inputted to a three-point interpolation rangefinding circuit 8 which calculates a distance by a conventional three-point interpolation method. The description of three-point interpolation given with reference to FIGS. 15A to 15C.

If the U-shaped correlation curve detector 6 judges that two or more subjects are present at different distances in a rangefinding area, the correlation curve is inputted to the two-subject separation rangefinding circuit 7 which calculates two distance values assuming that there are two subjects at different distances. One of the two distance values is selected and outputted in accordance with whether a near distance is preferential or a far distance is preferential.

A correlation factor curve obtained by the correlation calculation circuit 5 will be described.

An image of a subject is focussed onto the base photosensor 3B by the base photosensor lens 2B, and is focussed onto the reference photosensor 3R by the reference photosensor lens 2R. Correlation factors between these two images are calculated. A correlation factor curve is obtained by calculating a correlation factor between an image sampled from an area of each light receiving element of the reference photosensor 3R while sequentially shifting the area in unit of an element pitch and an image sampled from an area of a corresponding fixed element of the base photosensor 3B.

Next, three patterns of a correlation factor curve will be described.

Figure 2A:
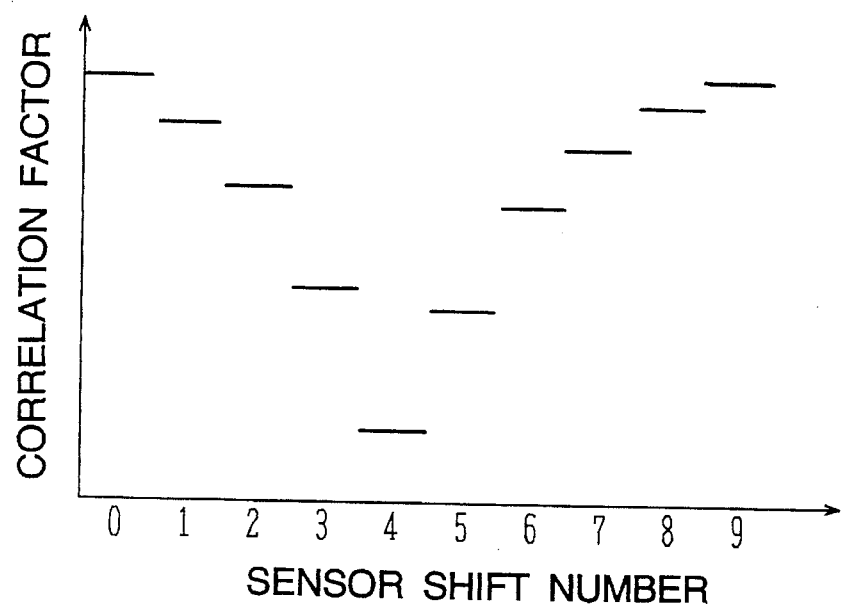
Figure 2B:
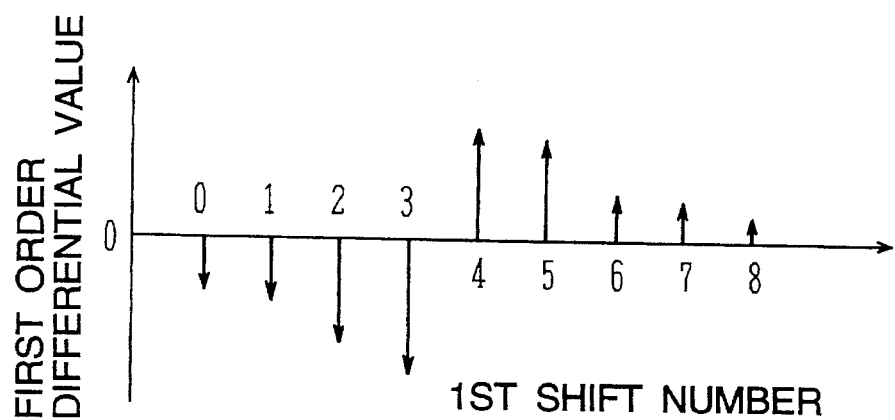
Figure 2C:
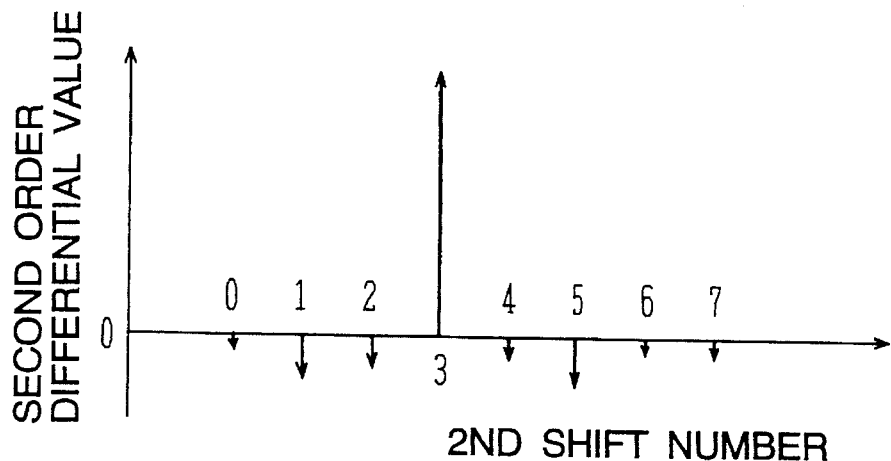

FIGS. 2A, 2B, and 2C illustrate the case of a V-shaped correlation factor curve.

FIG. 2A shows a correlation factor curve plotting correlation factors at sensor shift numbers from 0 to 9. This curve has a minimum correlation factor at the sensor shift number of 4. This minimum correlation factor is very small relative to other factors at the other sensor shift numbers.

FIG. 2B shows a first order differential curve of the curve shown in FIG. 2A. The abscissa of FIG. 2B is displaced from the abscissa of FIG. 2A by a half phase. A differential value at the transition from the correlation factor of the sensor shift number of 0 to the correlation factor of the sensor shift number of 1 is a first order differential value at a first shift number of 0. While the correlation factor decreases, the first order differential value takes a negative value, whereas the correlation factor increases, the first order differential value takes a positive value. The absolute value of the first order differential value becomes larger at the position nearer to the minimum correlation factor. A minimum first order differential value is at the first shift number of 3, and the maximum value is at the first shift number of 4.

The first shift number of the minimum first order differential value is represented by min, and the first shift number of the maximum first order differential value is represented by max. In the example shown in FIG. 2A, min=3 and max=4. The relationship between min and max is given by:

$$min+1=max$$

A difference between min and max is 1 which means that the first shift numbers of the minimum and maximum first order differential values are consecutive. This also means that there is a single subject and the sensor shift number corresponding to the subject distance is about 4.0. In this case, a distance value can be obtained precisely by a conventional three-point interpolation method by using the minimum correlation factor and other two factors having phases before and after that of the minimum correlation factor.

FIG. 2C is a second order differential curve of the curve shown in FIG. 2A. The abscissa of FIG. 2C is displaced from the abscissa of FIG. 2B by a half phase because the first order differential values are differentiated to obtain the second order differential values.

The second order differential curve shown in FIG. 2C takes a maximum value at the second shift number of 3. This maximum value is very large relative to other factors at the other second shift numbers. The second order differential value at the second shift number of 3 on the second order differential curve of FIG. 2C corresponds to the correlation factor at the sensor shift number of 4 on the correlation factor curve shown in FIG. 2A.

The maximum second order differential value appears near the second shift number corresponding to the subject distance. It is therefore possible to obtain a distance value from the second shift number of the maximum second order differential value detected from the second order differential curve. A more precise distance value can be obtained by a three-point interpolation method using the maximum second order differential value and two values having different phases before and after the phase of the maximum second order differential value.

Figure 3A:
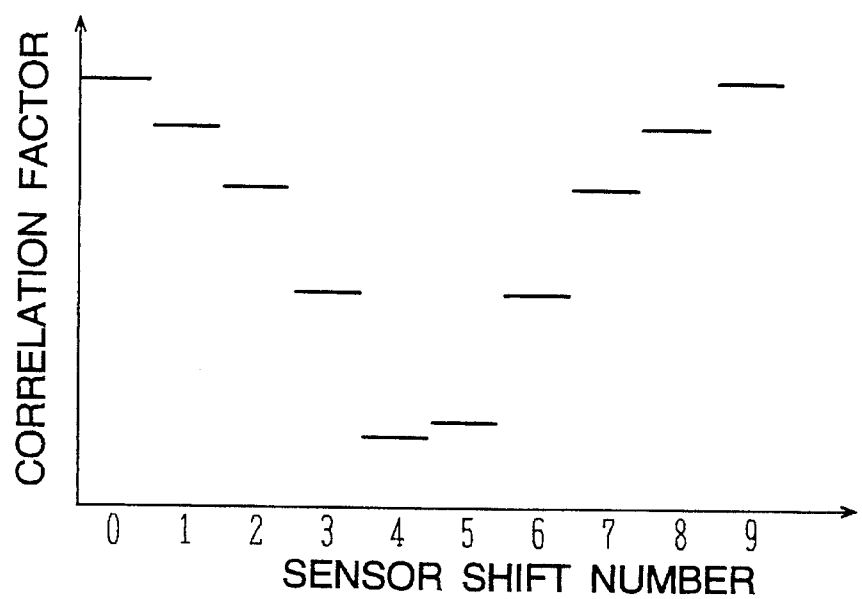
Figure 3B:
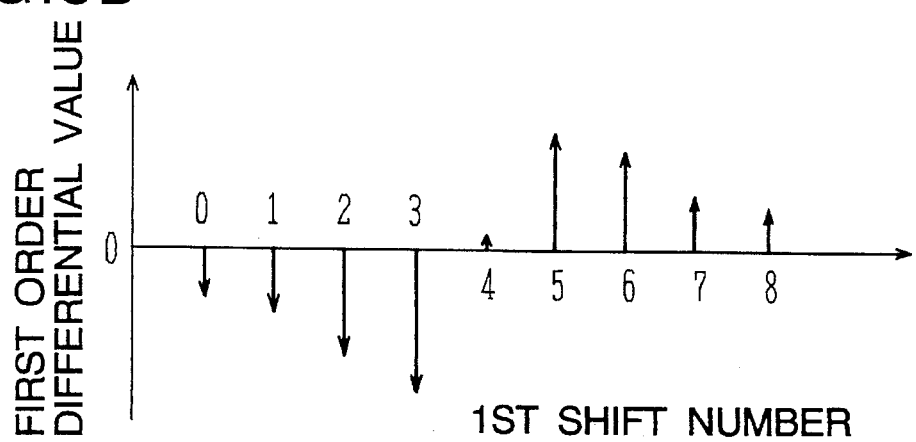
Figure 3C:
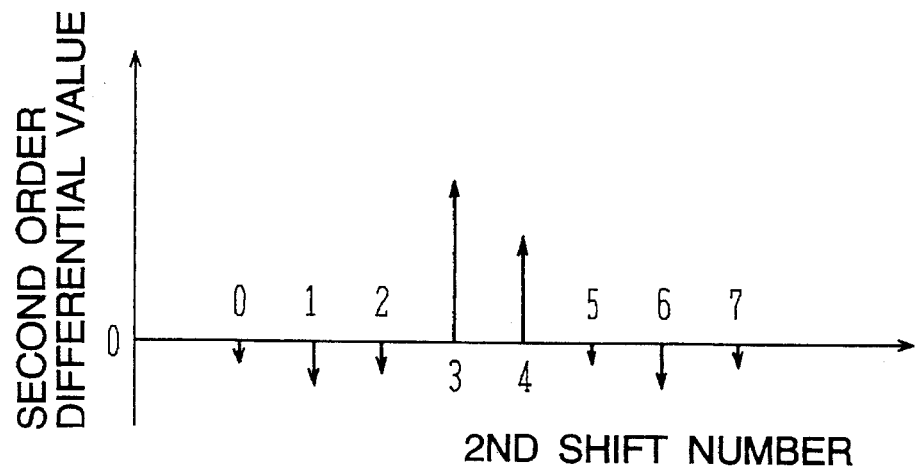

FIGS. 3A, 3B, and 3C illustrate the case of another V-shaped correlation factor curve.

FIG. 3A shows a correlation factor curve plotting correlation factors at sensor shift numbers from 0 to 9. This curve has a minimum correlation factor at the sensor shift number of 4. This minimum correlation factor takes a value very near to that at the sensor shift number of 5.

The correlation factors at the sensor shift numbers 4 and 5 are very small relative to other factors at the other sensor shift numbers. Although correlation factors are distributed dispersedly at discrete sensor shift numbers, a V-shaped curve is formed by connecting respective dispersed points. A true minimum correlation factor is at the intermediate between the sensor shift numbers of 4 and 5.

FIG. 3B shows a first order differential curve of the curve shown in FIG. 3A. A minimum first order differential value is at the first shift number of 3, and the maximum value is at the first shift number of 5.

In the example shown in FIG. 2A, min=3 and max=5. The relationship between min and max is given by:

$$min+2=max$$

A difference between min and max is 2 which means that the first shift numbers of the minimum and maximum first order differential values are separated by 2. This also means that there is a single subject and the sensor shift number corresponding to the subject distance is an intermediate value of about 4.4 between 4 and 5. In this case, a distance value can be obtained precisely by a three-point interpolation method.

FIG. 3C is a second order differential curve of the curve shown in FIG. 3A. The abscissa of FIG. 3C is displaced from the abscissa of FIG. 3B by a half phase.

The second order differential curve shown in FIG. 3C takes a maximum value at the second shift number of 3. This maximum second order differential value very near to the second order differential value at the second shift number of 4. The sensor shift number corresponding to the subject distance is about 4. A true maximum second order differential value appears at the second shift number of 3.4 corresponding to the sensor shift number of 4.4.

This true maximum second order differential value appears at the second shift number corresponding to the subject distance. It is therefore possible to obtain a distance value from the maximum second order differential value detected from the second order differential curve and two values having different phases before and after the phase of the maximum second order differential value.

Figure 4A:
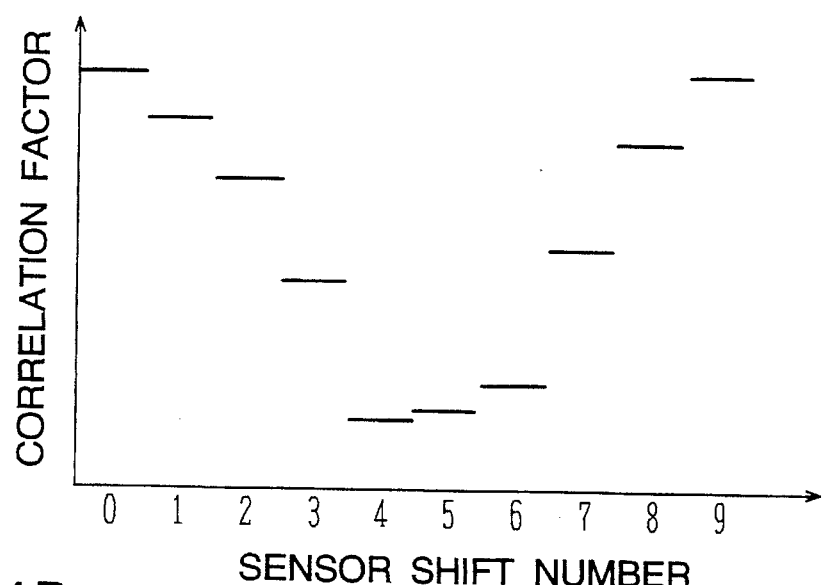
Figure 4B:
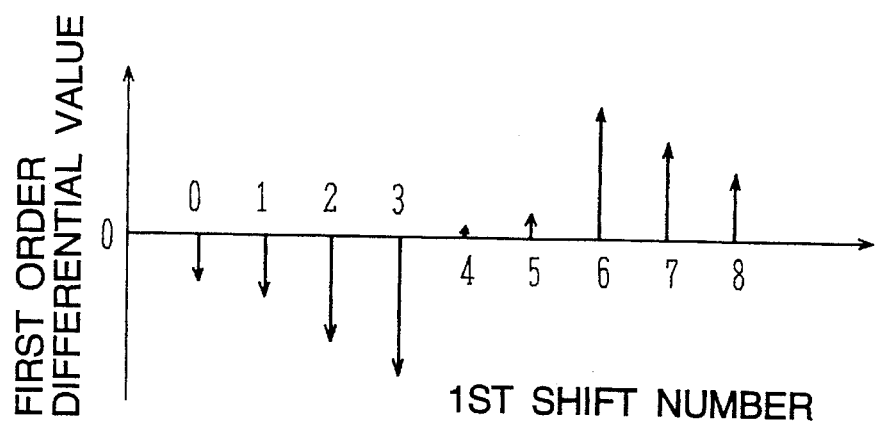
Figure 4C:
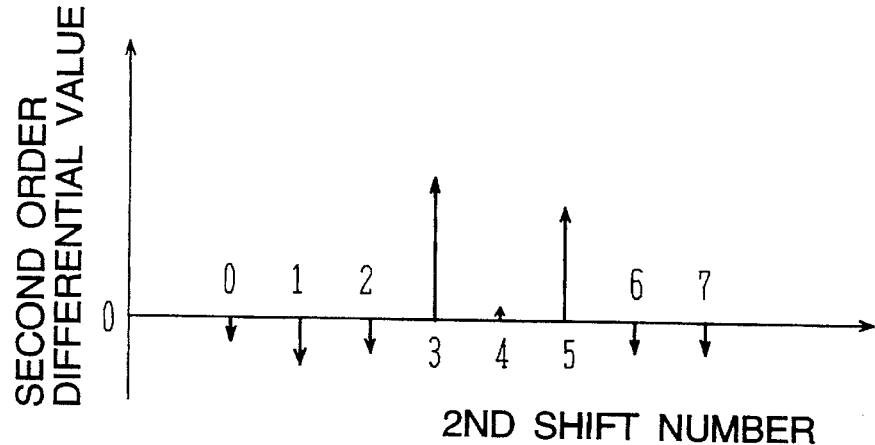

FIGS. 4A, 4B, and 4C illustrate the case of a U-shaped correlation factor curve.

FIG. 4A shows a correlation factor curve plotting correlation factors at sensor shift numbers from 0 to 9. This curve has a minimum correlation factor at the sensor shift number of 4. This minimum correlation factor takes a value very near to the correlation factors at the sensor shift numbers of 5 and 6.

The correlation factors at the sensor shift numbers 4, 5, and 6 are very small relative to other correlation factors at the other sensor shift numbers. If there is only a single subject, the phase difference between the minimum and maximum first order differential values is 1 or 2 as explained with FIGS. 2A to 2C and 3A to 3C.

In the case of the correlation curve shown in FIG. 4A, it is assumed that the correlation curve contains distance information of two subjects at different distances. A distance value obtained by a three-point interpolation method is derived from the distance information of the two subjects as the distance information of a single subject and outputs a median of two distance values, resulting in a distance value of low reliability.

FIG. 4B shows a first order differential curve of the curve shown in FIG. 4A. A minimum first order differential value is at the first shift number of 3, and the maximum value is at the first shift number of 6.

In the example shown in FIG. 4A, min=3 and max=6. The relationship between min and max is given by:

$$min+3=max$$

A difference between min and max is 3 which means that the first shift numbers of the minimum and maximum first order differential values are separated by 3. This also means that there are two or more subjects and at least two subjects are present at different distances between the sensor shift numbers 3 to 7.

Since the image in the correlation curve contains two subjects at different distances, it becomes necessary to detect two distance values of the subjects. However, it is very difficult to obtain distance values of the two subjects at different distances from the correlation curve shown in FIG. 4A.

FIG. 4C shows a second order differential curve of the curve shown in FIG. 4A. The abscissa of FIG. 4C is displaced from the abscissa of FIG. 4B by a half phase.

In the case of the V-shaped correlation curves shown in FIGS. 2A and 3A, distance values can be obtained by using second order differential curves. Similarly, as seen from FIG. 4C, a distance value Call be obtained from the second order differential curve of the U-shaped correlation factor curve shown in FIG. 4A.

From the first order differential curve shown in FIG. 4B, it is possible to assume that there are two distance values between the sensor shift numbers from 3 to 7 on the correlation factor curve. Two large second order differential values appear on the second order differential curve at the second shift numbers of 3 and 5. Distance values can be obtained from these two second shift numbers. A method of obtaining distance values in such a case will be later described as a two-subject separation method.

The U-shaped correlation factor curve detector 6 shown in FIG. 1 judges that a correlation factor curve is a U-shaped correlation factor curve if a difference between min and max is 3 or more, and that a correlation factor curve is a V-shaped correlation factor curve if a difference is 2 or less.

For the V-shaped correlation curve such as the correlation curves shown in FIGS. 2A and 3A, the three-point interpolation rangefinding circuit 8 shown in FIG. 1 calculates a distance by using the three-point interpolation method. For the U-shaped correlation curve such as the correlation curve shown in FIG. 4A, the two-subject separation rangefinding circuit 7 shown in FIG. 1 calculates a distance more reliably by using the two-subject separation method to be described later.

Figure 5A:
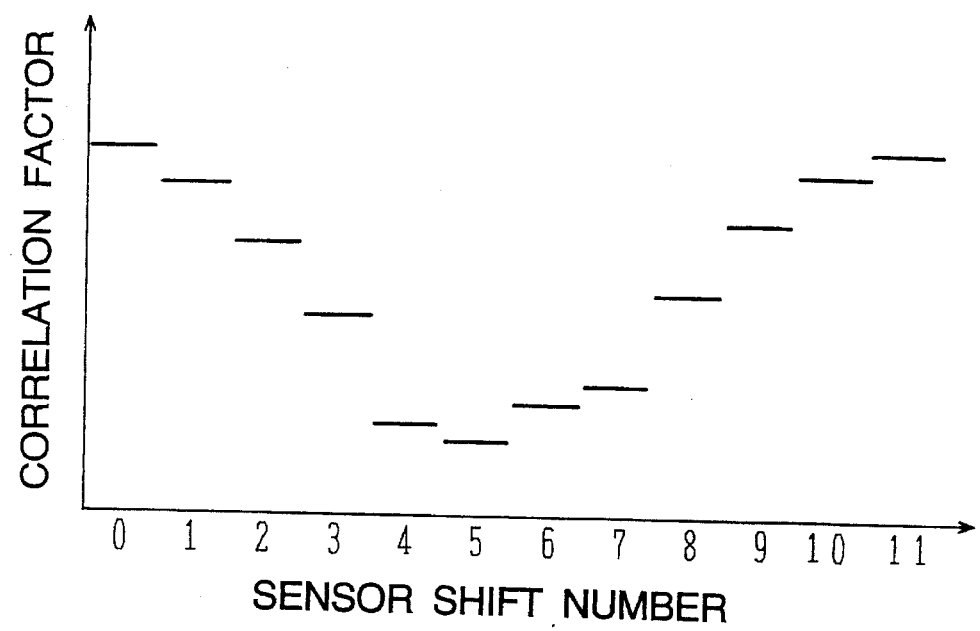
Figure 5B:
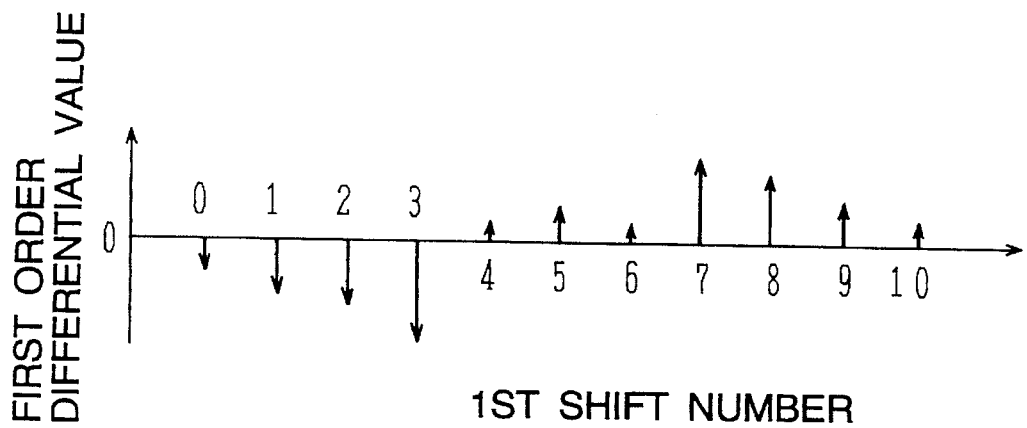
Figure 5C:
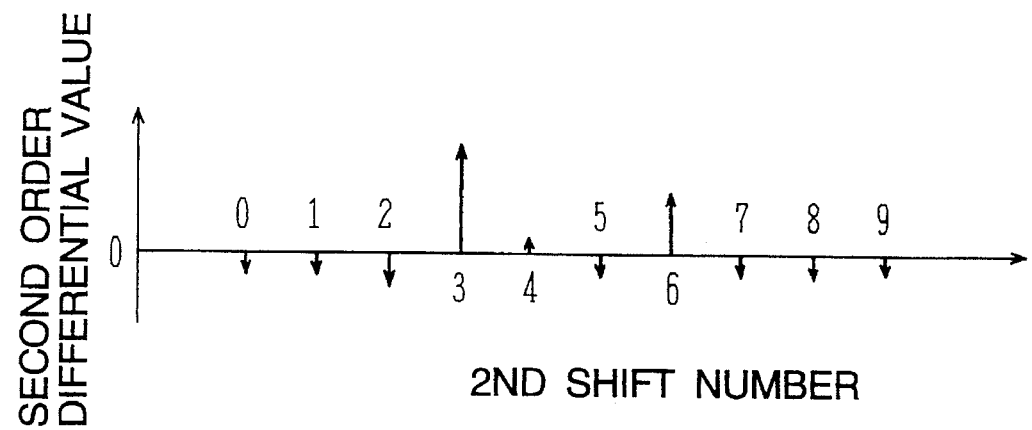

FIGS. 5A, 5B, and 5C are diagrams explaining distance calculation by the two-subject separation method.

FIG. 5A shows a correlation factor curve obtained by the correlation calculation circuit 5 shown in FIG. 1, the curve plotting correlation factors at sensor shift numbers from 0 to 9. This curve has a minimum correlation factor at the sensor shift number of 5.

FIG. 5B shows a first order differential curve of the curve shown in FIG. 5A. A minimum first order differential value is at the first shift number of 3, and the maximum value is at the first shift number of 7. In the example shown in FIG. 5A, min=3 and max=7. The relationship between min and max is given by:

$$min+4=max$$

A difference between min and max is 4 which means that the first shift numbers of the minimum and maximum first order differential values are separated by 4. Since a difference between min and max of the first order differential values is larger than 3, the U-shaped correlation factor detector 6 shown in FIG. 1 judges that the correlation curve is a U-shaped correlation factor curve.

FIG. 5C shows a second order differential curve of the curve shown in FIG. 5A. The abscissa of FIG. 5C is displaced from the abscissa of FIG. 5B by a half phase because the second order differential curve is obtained by differentiating the first order differential curve.

Figure 5D:
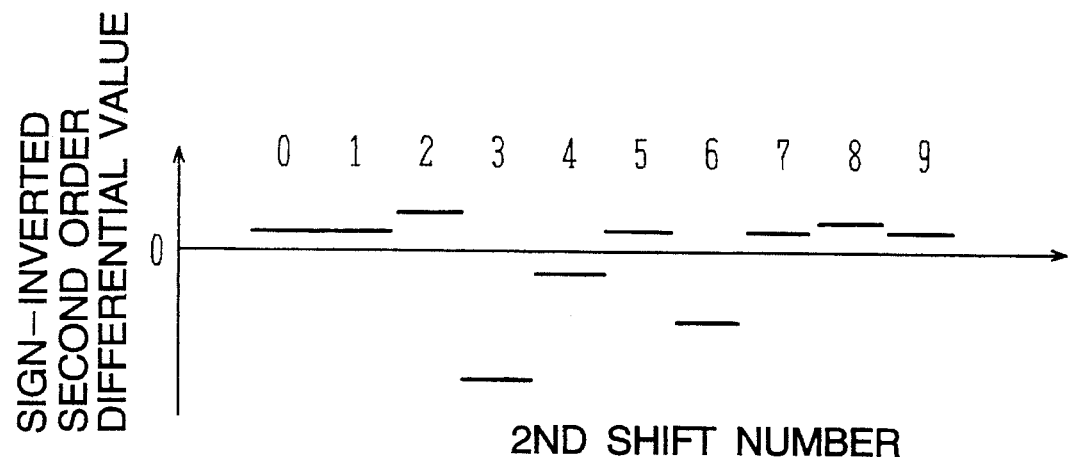

FIG. 5D shows a sign-inverted second order differential curve of the curve shown in FIG. 5A.

It is assumed here that if a correlation factor curve is of a U-character shape, there are two subjects at different distances. First and second smallest negative second differential values correspond to distances of two subjects.

The sign-inverted second order differential curve shown in FIG. 5D has the first smallest negative value at the second shift number of 3 and the second smallest negative value at the second shift number of 6. Distances to two subjects approximately correspond to the second shift numbers of 3 and 6.

The first and second smallest negative values and, corresponding values having different phases before and after the phases of the first and second smallest negative values are used to obtain the second shift numbers at a high precision by using a three-point interpolation method. In the case of the sign-inverted second order differential curves shown in FIG. 5D, three second order differential values at the second shift numbers of 2, 3, and 4 are used to calculate the first distance value by a three-point interpolation method, and three second order differential values a the second shift numbers of 5, 6, and 7 are used to calculate the second distance value by a three-point interpolation method.

The two-subject separation rangefinding circuit 7 shown in FIG. 1 calculates the first and second distance values. If necessary, one of the two distance values is selected. If a near distance is preferential, the distance value corresponding to the larger shift number is selected, whereas if a far distance is preferential, the distance value corresponding to the smaller shift number is selected.

With the sign-inverted second order differential curve shown in FIG. 5D, for the near distance priority, the second distance value near at the second shift number of 6 is selected, and for the far distance priority, the first distance value near at the second shift number of 3 is selected.

In the above description, two distance values have been calculated by using the sign-inverted second order differential curve shown in FIG. 5D while providing similarity to the correlation factor curve. Obviously, instead of using this curve, the second order differential curve shown in FIG. 5C may be used to calculate two distance values.

In the latter case, first and second largest second order differential values of the second order differential curve are selected, and the three-point interpolation method is used for each of the first and second largest differential values to obtain two distance values at a high precision.

A distance value calculation process described above will be detailed with reference to flow charts.

Figure 6:
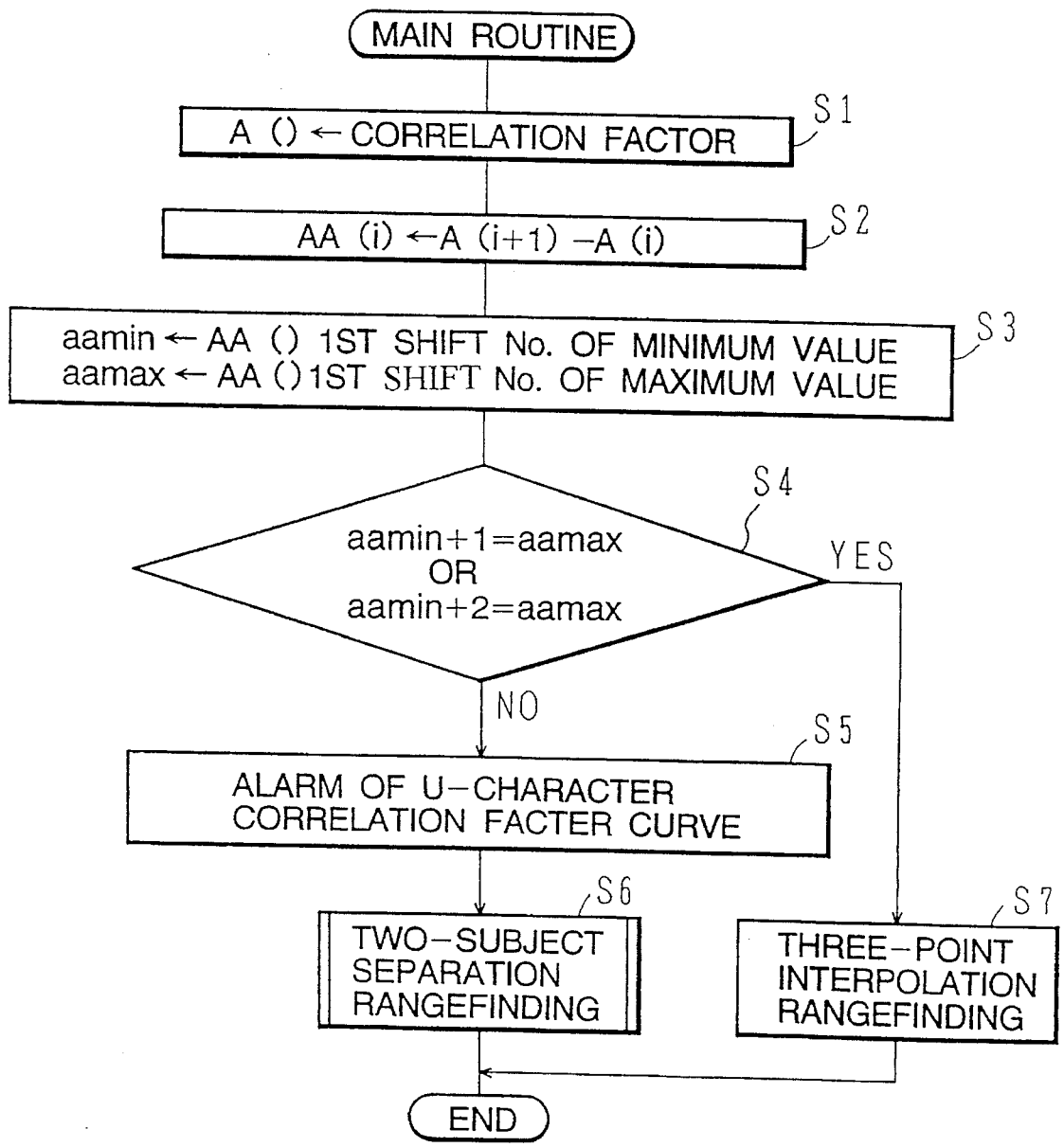
FIG. 6 is a main flow chart of a distance value detecting process.

FIG. 6 is a flow chart of a main routine of the distance value calculation process.

When the process starts at Step S1, correlation factors are calculated between an image of a subject focussed on the base photosensor and an image of the subject focussed on the reference photosensor at respective sensor shift numbers (phase differences) while shifting the image sampling area of each light receiving element of the reference photosensor in a unit of a sensor element pitch. In this manner, (n+1) correlation factors are obtained at the sensor shift numbers of 0 to n. These (n+1) correlation factors are stored in a correlation factor array A( ) for correlation factor segments A(0) to A(n).

At Step S2, first order differentiation calculations of the (n+1) correlation factors at respective sensor shift numbers are performed. The first order differential value array AA( ) is obtained by using the correlation factor array A( ) from the following equation.

$$AA(i)=A(i+1)-A(i)$$

where i=0, 1, 2, ..., n−1. While a counter counts from 0 to n−1, first order differentiation calculations are performed for each i to obtain first order differential values AA(0) to AA(n−1). In this manner, n first order differential values AA(0) to AA(n−1) are obtained from (n+1) correlation factors A(0) to A(n), i.e., first order differential values at n first shift numbers are obtained from correlation factors at (n+11 ) sensor shift numbers.

At Step S3, the minimum first order differential value is obtained from the first order differential values AA(0) to AA(n−1). The first shift number of the minimum first order differential value is stored in a minimum first shift number memory aamin.

Next, the maximum first order differential value is obtained from the first order differential values AA(0) to AA(n−1). The first shift number of the maximum first order differential value is stored in a maximum first shift number memory aamax.

At Step S4, it is checked as to whether the correlation factor curve is of a V-character shape or of a U-character shape. The values in the minimum and maximum first shift numbers stored in the memories aamin and aamax are checked as to whether they satisfy the following equations.

$$aamin+1=aamax \ldots \quad (S4\text{-}1)$$

$$aamax+1=aamin \ldots \quad (S4\text{-}2)$$

If both the equations S4-1 and S4-2 are not satisfied, it is judged that the correlation factor curve is a U-shaped correlation factor curve, and the flow advances to Step S5.

If one of the equations S4-1 and S4-2 is satisfied, it is judged that the correlation factor curve is a V-shaped correlation factor curve, and the flow advances to Step S7.

At Step S5 an alarm is issued to the effect that the correlation factor curve is a U-shaped correlation curve. This alarm indicates that a distance value of high reliability cannot be obtained from the correlation factor array A( ) obtained at Step S1 even if a three-point interpolation method is used, and that there are two or more subjects at different distances in a rangefinding area.

At Step S6, a two subject separation rangefinding process is performed. An alarm to the effect that a distance value of a high reliability cannot be obtained by a three-point interpolation method was issued at Step S5, and it is assumed here that there are two subjects at different distances in the rangefinding area. After a distance value is calculated at the two-subject separation rangefinding process, the distance value calculation process is terminated. The detailed description of the two-subject separation rangefinding process will be later described with reference to a flow chart.

At Step S7, three-point interpolation rangefinding calculations are performed using the V-shaped correlation factor curve. The minimum correlation factor is obtained from the correlation factors A(0) to A(n). A distance value is calculated by a three-point interpolation rangefinding method by using three correlation factors including the minimum correlation factors and two correlation factors having different phases before and after the phase of the minimum correlation factor. After a distance value is calculated by the three-point interpolation rangefinding method, the distance value calculation process is terminated.

Figure 7:
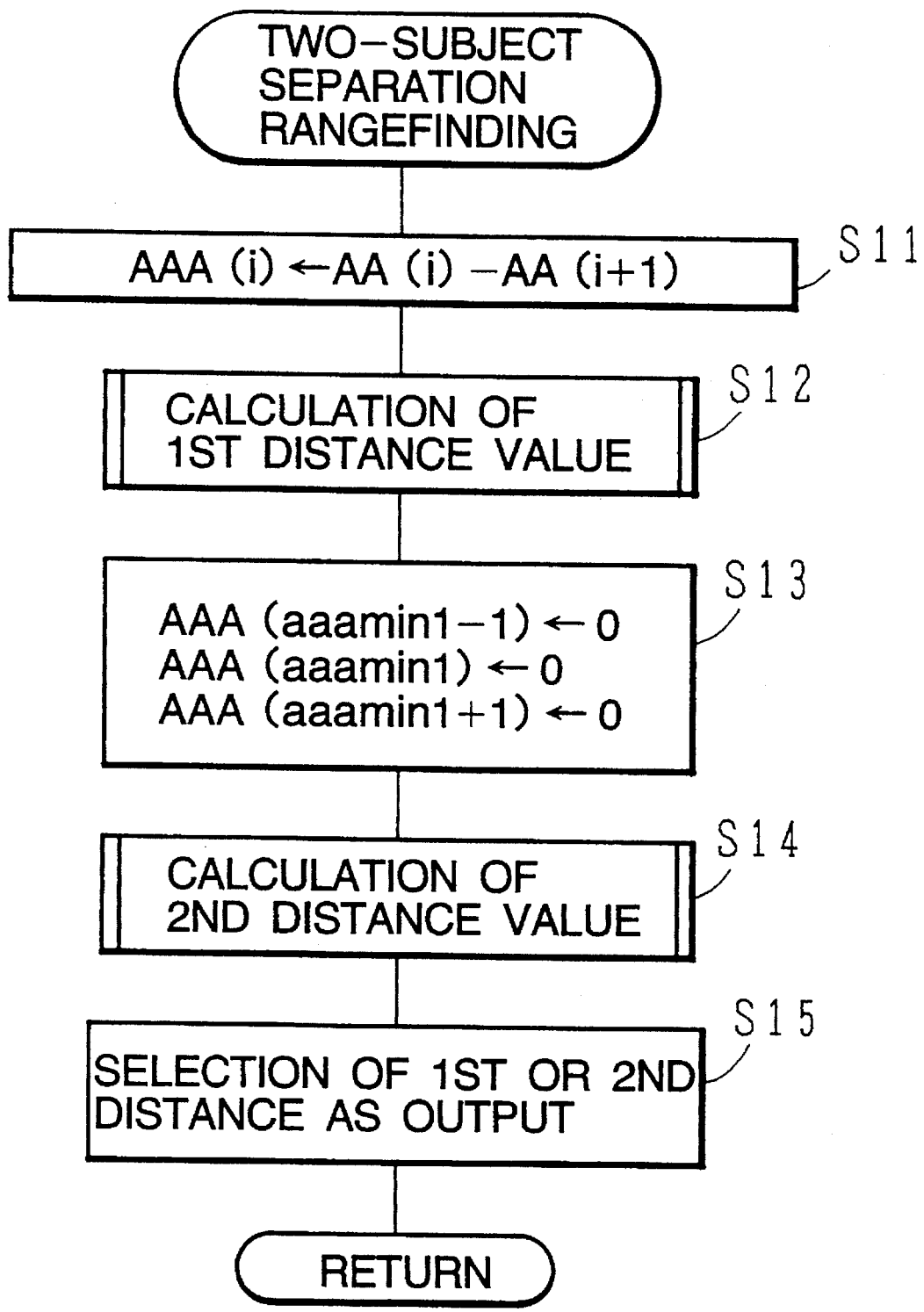
FIG. 7 is a flow chart of a two-subject separation rangefinding process.

FIG. 7 is a flow chart of a two-subject separation rangefinding process. It is assumed here that there are two subjects at different distances in a rangefinding area. The distance values of two subjects are calculated in the following manner.

When the process starts at Step S11, second order differentiation calculations of correlation factors are performed for respective sensor shift numbers. The second order differential value array AAA( ) is obtained from the following equation. The first order differential values AA(0) to AA(n–1) of the first order differential value array AA( ) have been obtained at Step S2 shown in FIG. 6.

$$AAA(i)=AA(i)-AA(i+1)$$

where i=0, 1, 2, . . . , n–2. While the counter counts from 0 to n–2, second order differentiation calculations are performed for each i to obtain sign-inverted second order differential values AAA(0) to AAA(n–2). In this manner, (n–1) sign-inverted second order differential values AAA(0) to AAA(n–2) are obtained from n first order differential values AA(0) to AA(n–1), i.e., sign-inverted second order differential values at (n–1) second shift numbers are obtained from first order differential values at n first shift numbers.

At Step S12, a first distance value of a first one of the two subjects at different distances in the rangefinding area is calculated. The minimum sign-inverted second order differential value is obtained from the sign-inverted second order differential values AAA(0) to AAA(n–2). The second shift number of the minimum sign-inverted second order differential value is stored in a minimum second shift number memory aamin1.

A three-point interpolation calculation is performed to obtain a first distance value by using the sign-inverted second order differential values AAA(aaamin1–1), AAA(aaamin1), and AAA(aaamin1+1) respectively of the minimum second shift number and adjacent two second shift numbers. The details of the first distance value calculation process will be later given with reference to a flow chart.

Next, at Step S13, three values AAA(aaamin1–1), AAA(aaamin1), and AAA(aaamin1+1) stored in a sign-inverted second order differential value memory are set to 0 to delete first subject information. These values have been used by the three-point interpolation method for the calculation of the first distance value at Step S12.

If the first and second smallest sign-inverted second order differential values are separated only by two shift numbers, two differential values except the differential value between the first and second smallest sign-inverted second order differential values are set to 0, because the latter differential value is used for the calculation of a second distance value by a three-point interpolation method. Setting only two differential values to 0 is performed in order to calculate the second distance value in the manner similar to the first distance value. Other processes may also be used.

At Step S14, a second distance value of the second one of the two subjects at different distances in the rangefinding area is calculated. Similar to Step S12, the second minimum sign-inverted second order differential value is obtained from the sign-inverted second order differential values AAA(0) to AAA(n–2). The second shift number of the second minimum sign-inverted second order differential value is stored in a second minimum second shift number memory aamin2.

A three-point interpolation calculation is performed to obtain a second distance value by using the sign-inverted second order differential values AAA(aaamin2–1), AAA(aaamin2), and AAA(aaamin2+1) respectively of the second minimum second shift number and adjacent two second shift numbers. The details of the second distance value calculation process will be later given with reference to a flow chart.

The first and second distance values are obtained in the above manner. At Step S15, a final distance value is determined from the first distance value calculated at Step S12 and the second distance value calculated at Step S14, and outputted as a measured distance value.

If necessary, one of the first and second distance values is selected and outputted as the final measured distance value. One method of selecting either the first or second distance value relies upon a near distance priority or far distance priority. In the near distance priority, the distance value of the subject at the near distance is selected, and in the far distance priority, the distance value of the subject at the far distance is selected. In the near distance priority, the distance value at a larger second shift number is selected, and in the far distance priority, the distance value at a smaller second shift number is selected.

Figure 8:
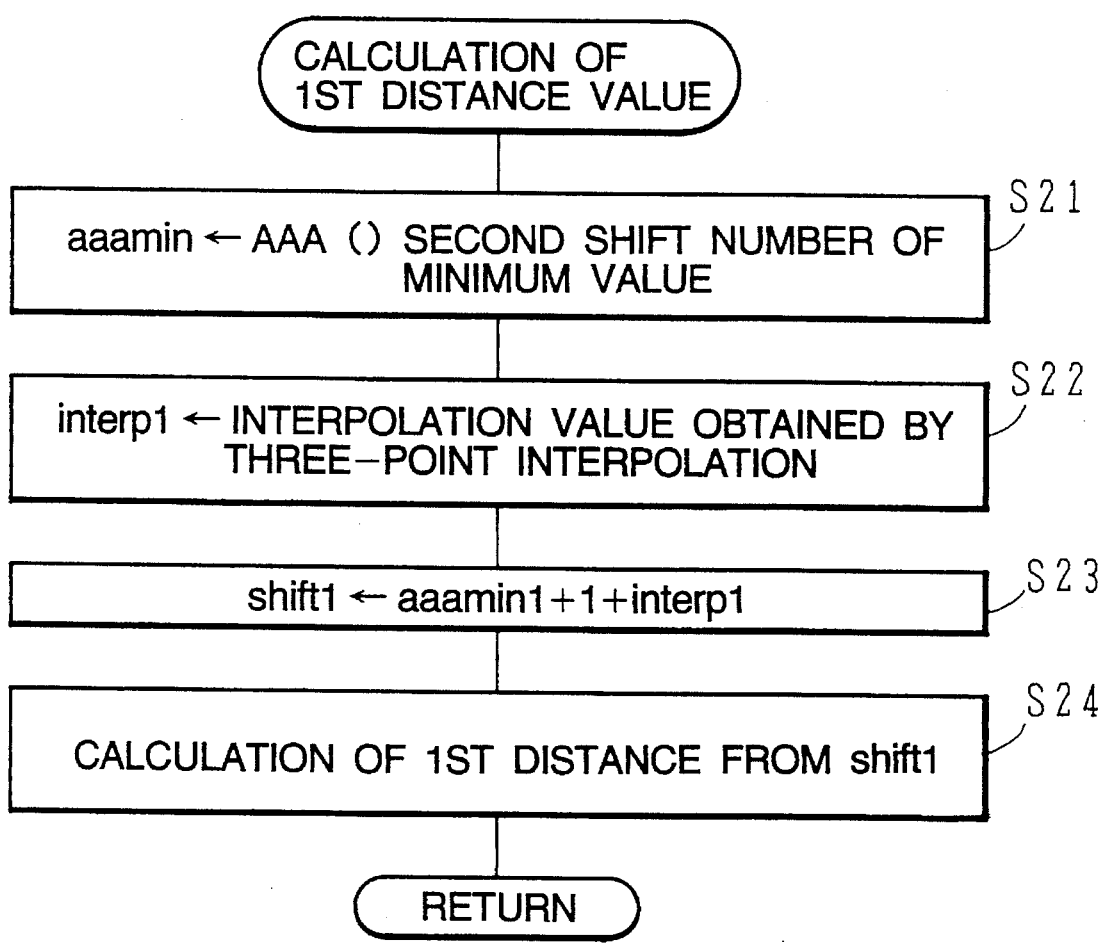
FIG. 8 is a flow chart of a first distance value calculation process.

FIG. 8 is a flow chart of a first distance value calculation process.

When the process starts at Step S21, the minimum sign-inverted second order differential value is obtained from the sign-inverted second order differential values AAA(0) to AAA(n–2). The second shift number of the minimum sign-inverted second order differential value is stored in the minimum second shift number memory aaamin1.

At Step S22, a three-point interpolation method is performed to calculate a first interpolation value representing a difference from the value stored in the minimum second shift number memory aaamin1, by using three sign-inverted second order differential values AAA(aaamin1–1), AAA(aaamin1), and AAA(aaamin1+1), respectively of the minimum second shift number and two adjacent second shift numbers. The first interpolation value is stored in a first interpolation value memory interp1.

At Step S23 the value in the minimum second shift number memory aaamin1 is added to the first interpolation value interp1 to obtain a first minimum sensor shift number corresponding to the second shift number which is stored in a first minimum sensor shift number memory shift1. The first minimum sensor shift number is obtained from the following equation by using the values aaamin1 and interp1.

$$shift1=aaamin1+1+interp1.$$

1 is added to the right side of the equation because the second order differentiation has been performed and there is a shift of one phase difference.

Next, at Step S24, the first distance value is calculated from the first minimum sensor shift number. The sensor shift number is represented by an inverse of a subject distance. Therefore, a subject distance becomes shorter as the sensor shift number becomes larger, and it becomes longer as the number becomes smaller. In the above manner, the first distance value calculation process is performed.

Figure 9:
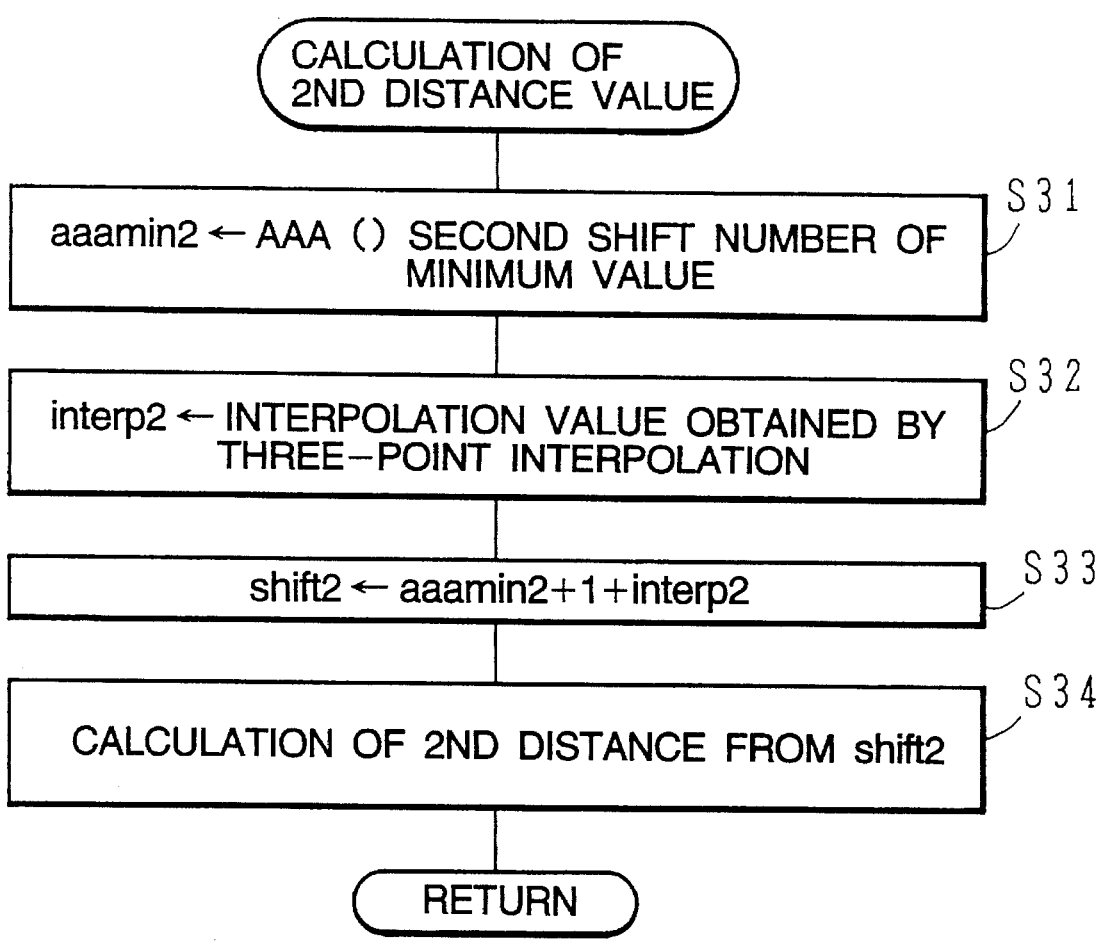
FIG. 9 is a flow chart of a second distance value calculation process.

FIG. 9 is a flow chart of a second distance value calculation process.

When the process starts at Step S31, the second minimum sign-inverted second order differential value is obtained from the sign-inverted second order differential values AAA(0) to AAA(n–2). The second shift number of the second minimum sign-inverted second order differential value is stored in the second minimum second shift number memory aaamin2.

At Step S32, a three-point interpolation method is performed to calculate a second interpolation value representing a difference from the value stored in the second minimum second shift number memory aaamin2, by using three sign-inverted second order differential values AAA(aaamin2−1), AAA(aaamin2), and AAA(aaamin2+1), respectively of the second minimum second shift number and two adjacent second shift numbers. The second interpolation value is stored in a second interpolation value memory interp2.

At Step S33 the value in the second minimum second shift number memory aaamin2 is added to the second interpolation value interp2 to obtain a second minimum sensor shift number corresponding to the second shift number which is stored in a second minimum sensor shift number memory shift2. The second minimum sensor shift number is obtained from the following equation by using the values aaamin2 and interp2.

$$shift2=aaamin2+1+interp2.$$

1 is added to the right side of the equation because the second order differentiation has been performed and there is a shift of one phase difference.

Next, at Step S34, the second distance value is calculated from the second minimum sensor shift number. The sensor shift number is represented by an inverse of a subject distance. Therefore, a subject distance becomes shorter as the sensor shift number becomes larger, and it becomes longer as the number becomes smaller. In the above manner, the second distance value calculation process is performed.

FIG. 10 is a table showing the measurement results of a single object in a rangefinding area by a phase difference detection type rangefinding method according to an embodiment of the present invention. In the measurements, a portrait was placed at a position remote from a phase difference detection type rangefinder by 1.2 m. The optical system of the rangefinder was set to have a product of Bf=98.4460 where B is a base length represented in mm and f is a distance between the lens and sensor represented in mm.

In the table shown in FIG. 10, correlation factors for the sensor shift numbers from 0 to 16 and first order differential values for the first shift numbers from 0 to 15 are shown. The correlation factors A(0) to A(16) are calculated while sequentially shifting the sensor shift numbers from 0 to 16. The first order differential values AA(0) to AA(15) are calculated by first order differentiation calculations of the correlation factors A(0) to A(16).

The minimum first order differential value among the first order differential values AA(0) to AA(15) was −31. The first shift number of the minimum first order differential value was 6.

The maximum first order differential value among the first order differential values AA(0) to AA(15) was +32. The first shift number of the maximum first order differential value was 8.

The difference between the minimum first shift number aamin and the maximum first shift number aamax was 2 which satisfies the following equation.

$$aamin+2=aamax.$$

This correlation factor curve is judged therefore to be a V-shaped correlation factor curve, so that a three-point interpolation method was performed.

Of the correlation factors A(0) to A(16), the minimum correlation factor of 133 was obtained at the sensor shift number of 8. A three-point interpolation method was performed to calculate an interpolation value by using three correlation values respectively of the minimum sensor shift number and two adjacent sensor shift numbers 7, 8, and 9.

The calculated interpolation value was −0.0047. Therefore, the sensor shift number of the true minimum correlation value is 7.953. By using this value, the distance to the portrait (1.2 m) was calculated which was 1.1920 m.

FIG. 11 is a table showing the measurement results of two objects in a rangefinding area by the phase difference detection type rangefinding method of the embodiment. In the measurements, a portrait was placed at a position remote from a phase difference detection type rangefinder by 1.2 m, and a black rod was placed at a position remote from the rangefinder by 0.7 m. Similar to the case explained with FIG. 10, the optical system of the rangefinder was set to have a product of Bf=98.4460 where B is a base length represented in mm and f is a distance between the lens and sensor represented in mm.

In the table shown in FIG. 11, correlation factors for the sensor shift numbers from 0 to 16, first order differential values for the first shift numbers from 0 to 15, and second order differential values for the second shift numbers from 0 to 14, are shown. The correlation factors A(0) to A(16) and first order differential values were calculated in the manner corresponding to FIG. 10.

The minimum first order differential value among the first order differential values AA(0) to AA(15) was −34. The first shift number of the minimum first order differential value was 7.

The maximum first order differential value among the first order differential values AA(0) to AA(15) was +28. The first shift number of the maximum first order differential value was 11.

The difference between the minimum first shift number aamin and the maximum first shift number aamax was 4 which satisfies the following equation.

$$aamin+4=aamax.$$

This correlation factor curve is judged therefore to be a U-shaped correlation factor curve, so that a two-subject separation rangefinding method was performed.

Figure 12A:
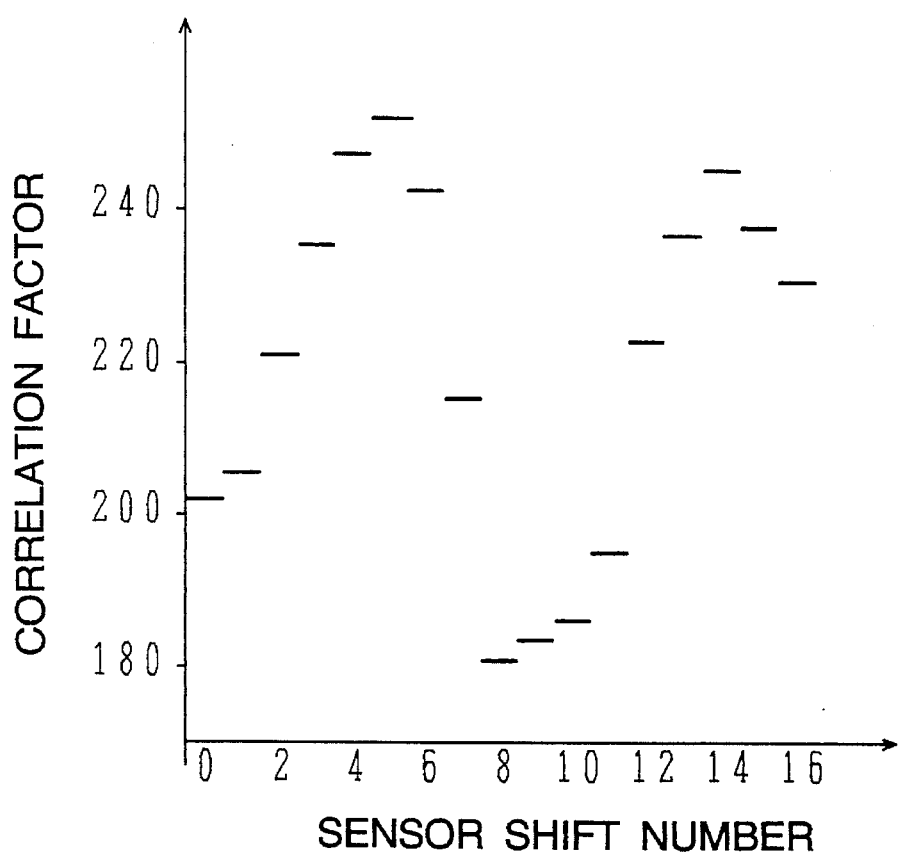
FIG. 12A is a graph showing the measurement results of correlation factors given in the table of FIG. 11.

FIG. 12A is a graph showing the measurements results of correlation factors given in the table of FIG. 11. The correlation factors of the sensor shift numbers from 0 to 16 are shown. As appreciated from the table of FIG. 11, since a difference between the minimum and maximum first shift numbers is 4, it can be judged that the graph of FIG. 12A shows a U-shaped correlation factor curve.

Figure 12B:
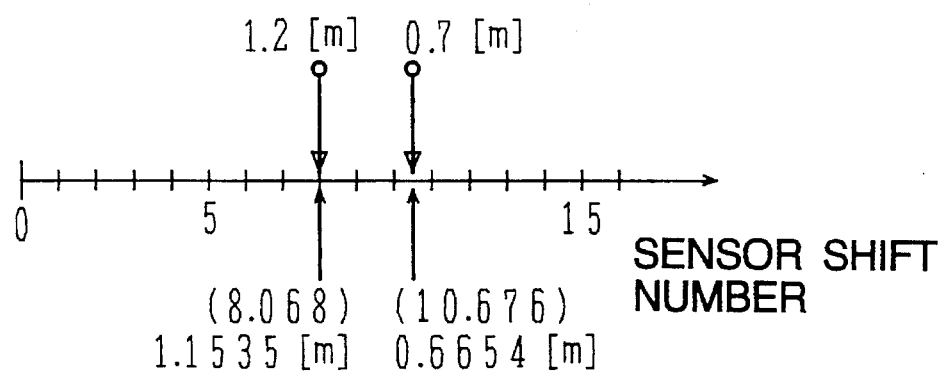
FIG. 12B shows distance values calculated from the measurement results of correlation factors given in the table of FIG. 11.
Figure 13A:
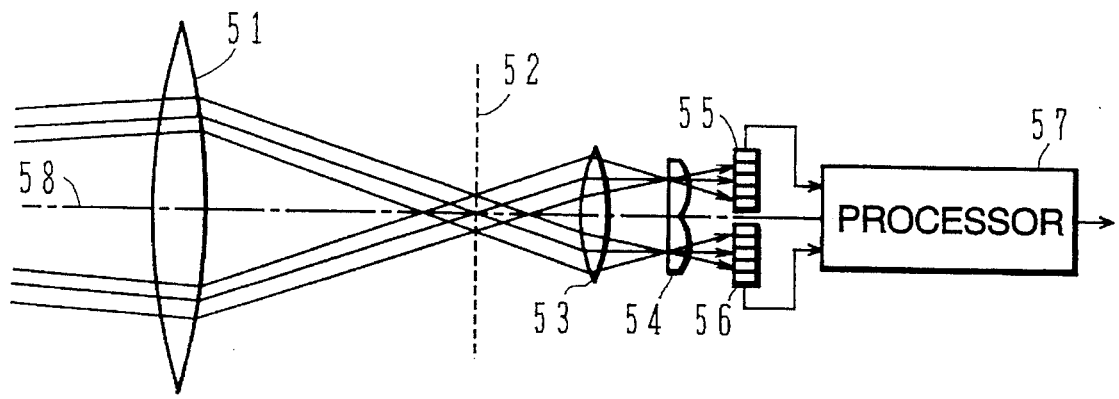
Figure 13B:
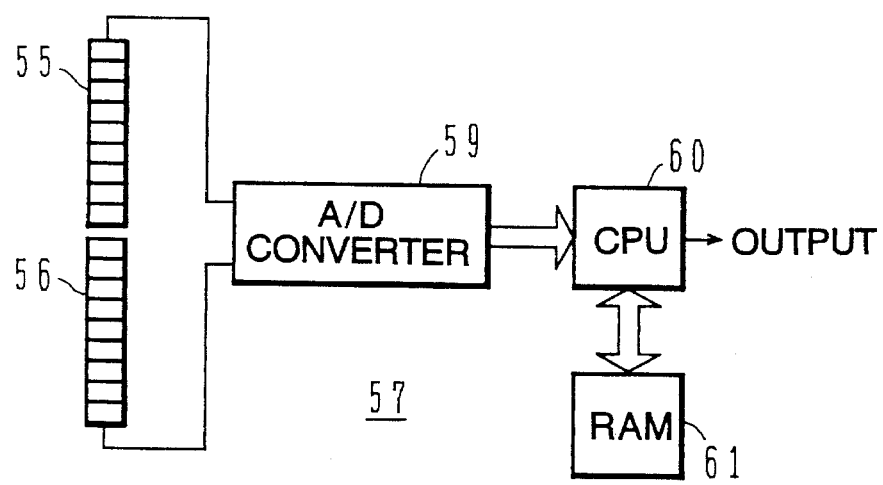

FIG. 12B is a graph showing distance values calculated from the measurement results given in the table of FIG. 11 by using a two-subject separation method. The first minimum sensor shift number of the first subject was 8 and its interpolation value was +0.068. The second minimum sensor shift number of the second subject was 11 and its interpolation value was −0.324. The distance values were calculated from the true sensor shift numbers. A distance to the portrait (1.2 m) was 1.1535 m, and a distance to the black rod (0.7 m) was 0.6654 m.

As appreciated from the foregoing description, it is possible to judge whether a correlation factor curve is of a U-character shape or of a V-character shape by detecting correlation factors between an image on the base photosensor and an image on the reference photosensor and performing first order differentiation calculations of the correlation factors. It is therefore possible to evaluate whether a distance value obtained by a three-point interpolation method is highly reliable or not.

If two subjects are present at different distances in a rangefinding area, second order differentiation calculations of correlation factors are performed by using a two-subject separation method to calculate distance values of the two subjects. If necessary, one of the two distance values may be selected in accordance with the near distance priority or far distance priority.

The present invention has been described in connection with the preferred embodiments. The invention is not limited only to the above embodiments. For example, distance values of three or more subjects can be calculated in a similar manner to the above-described manner. It is apparent to those skilled in the art that various modifications, improvements, combinations and the like can be made without departing from the scope of the appended claims.

We claim:

1. A phase difference detection type rangefinder comprising:

a base photosensor and a reference photosensor on which images of a subject are focussed;

correlation factor calculating means for calculating correlation factors between said images focussed on said base photosensor and said reference photosensor;

second order differential value calculating means for calculating second order differential values of said correlation factors calculated by said correlation factor calculating means;

second order differential value comparing means for selecting at least one maximum second order differential value from said second order differential values;

first three-point interpolation means for calculating at least one interpolation value by three-point interpolation in accordance with said maximum second order differential value and two second order differential values having different phases from said maximum second order differential value; and first distance value calculating means for calculating a distance value by using the phase of said maximum second order differential value and said interpolation value.

2. A phase difference detection type rangefinder according to claim 1, wherein:

said second order differential value comparing means selects two largest second order differential values from said second order differential values;

said first three-point interpolation means calculates two interpolation values by performing three-point interpolation using said two largest second order differential values selected by said second order differential value comparing means and two sets of two second order differential values having phases before and after the phases of said two largest second order differential values; and said first distance value calculating means calculates two distance values in accordance with the phases of said two largest second order differential values selected by said second order differential value comparing means and said two interpolation values calculated by said first three-point interpolation means.

3. A phase difference detection type rangefinder according to claim 2, further comprising:

first order differential value calculating means for calculating first order differential values of said correlation factors calculated by said correlation factor calculating means;

phase deriving means for deriving a first phase of a maximum value among said first order differential values calculated by said first order differential value calculating means and a second phase of a minimum value among said first order differential values;

phase comparing means for judging whether said first and second phases derived by said phase deriving means is separated by three phases or more; and first distance value outputting means for outputting distance values calculated by said first distance value calculating means if said phase comparing means judges that said first and second phases are separated by three phases or more.

4. A phase difference detection type rangefinder according to claim 3, wherein said base and reference photosensors each comprise a photosensor element having at least seven pixels.

5. A phase difference detection type rangefinder according to claim 3, further comprising:

second distance value calculating means for calculating a distance value in accordance with said correlation factors calculated by said correlation factor calculating means; and second distance value outputting means for outputting a distance value calculated by said second distance value calculating means if said phase comparing means judges that said first and second phases are separated by two phases or less.

6. A phase difference detection type rangefinder according to claim 5, wherein said second distance value calculating means further comprises:

means for deriving a minimum correlation factor from said correlation factors calculated by said correlation factor calculating means;

means for calculating an interpolation value by three-point interpolation using said minimum correlation factor and two correlation factors having phases before and after the phase of said minimum correlation factor; and means for calculating a distance value from the phase of said minimum correlation factor and said interpolation value.

7. A phase difference detection type rangefinder according to claim 3, further comprising priority order designating means for designating either a near distance priority or a far distance priority, wherein said first distance value outputting means selects a near distance value from said two distance values calculated by said first distance value calculating means and outputs said near distance value if said priority order designating means designates said near distance priority, selects a far distance value from said two distance values and outputs said far distance value if said priority order designating means designates said far distance priority.

8. A phase difference detection type rangefinder comprising:

a base photosensor and a reference photosensor on which images of a same subject are focussed;

correlation factor calculating means for calculating correlation factors between said images focussed on said base photosensor and said reference photosensor;

first order differential value calculating means for calculating first order differential values of said correlation factors calculated by said correlation factor calculating means;

phase deriving means for deriving a first phase of a maximum value among said first order differential values calculated by said first order differential value calculating means and a second phase of a minimum value among said first order differential values;

phase comparing means for judging whether said first and second phases derived by said phase deriving means is separated by three phases or more; and alarm signal generating means for generating an alarm signal if said phase comparing means judges that said first and second phases are separated by three phases or more.

9. A phase difference detection type rangefinder according to claim 8, further comprising alarm means for issuing an alarm in response to said alarm signal generated by said alarm signal generating means.

10. A phase difference detection type rangefinder according to claim 8, further comprising:

means for deriving a minimum correlation factor from said correlation factors calculated by said correlation factor calculating means;

means for calculating an interpolation value by three-point interpolation using said minimum correlation factor and two correlation factors having phases before and after the phase of said minimum correlation factor; and means for calculating a distance value from the phase of said minimum correlation factor and said interpolation value.

11. A method of determining a distance of each subject of two or more subjects located at different distances from a base photosensor by detecting a phase difference, comprising the steps of:

converting images of a subject focussed on the base photosensor and a reference photosensor into electric signals;

generating electric signals corresponding to correlation factors between the electric signals of the base photosensor and the reference photosensor;

generating electric signals corresponding to first order differential values of said correlation factors;

generating electric signals corresponding to second order differential values of said correlation factors from said electric signals corresponding to the first order differential values;

generating an electric signal corresponding to an interpolation value by three-point interpolation using a maximum second order differential value of said second order differential values and two second order differential values having phases before and after the phase of said maximum second order differential value; and generating an electric signal corresponding to a distance from the phase of said electric signal of the maximum second order differential value and said electric signal of the interpolation value.

12. A method of determining a distance of each subject of two or more subjects located at different distances from a base photosensor by detecting a phase difference, and indicating that two or more distance values are to be calculated, comprising the steps of:

converting images of a subject focussed on the base photosensor and a reference photosensor into electric signals;

generating electric signals corresponding to correlation factors between the electric signals of the base photosensor and the reference photosensor;

generating electric signals corresponding to first order differential values of said correlation factors;

generating electric signals corresponding to a maximum first order differential value and a minimum first order differential value from said electric signals corresponding to said first order differential values; and generating an alarm signal if the phases of said minimum and maximum first order differential values are separated by three phases or more.

* * * * *